United States Patent
Wang et al.

(10) Patent No.: US 12,192,915 B2
(45) Date of Patent: Jan. 7, 2025

(54) USER EQUIPMENT AND WIRELESS COMMUNICATION METHOD FOR POWER CONTROL OF SIDELINK CHANNEL TRANSMISSION

(71) Applicant: Panasonic Intellectual Property Corporation of America, Torrance, CA (US)

(72) Inventors: Lilei Wang, Beijing (CN); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 363 days.

(21) Appl. No.: 17/441,227

(22) PCT Filed: Mar. 28, 2019

(86) PCT No.: PCT/CN2019/080035
§ 371 (c)(1),
(2) Date: Sep. 20, 2021

(87) PCT Pub. No.: WO2020/191699
PCT Pub. Date: Oct. 1, 2020

(65) Prior Publication Data
US 2022/0159583 A1    May 19, 2022

(51) Int. Cl.
*H04L 5/00* (2006.01)
*H04W 52/24* (2009.01)
(Continued)

(52) U.S. Cl.
CPC ......... *H04W 52/242* (2013.01); *H04L 5/0051* (2013.01); *H04W 52/383* (2013.01); *H04W 92/18* (2013.01)

(58) Field of Classification Search
None
See application file for complete search history.

(56) References Cited

U.S. PATENT DOCUMENTS

2014/0274183 A1    9/2014    Zhu et al.
2018/0049129 A1    2/2018    Li et al.
(Continued)

FOREIGN PATENT DOCUMENTS

EP    3399808 A1    11/2018

OTHER PUBLICATIONS

Huawei et al., "Power control and power sharing for V2X sidelink," R1-1903074, Agenda Item: 7.2.4.1.5, 3GPP TSG RAN WG1 Meeting #96, Athens, Greece, Feb. 25-Mar. 1, 2019. (4 pages).

(Continued)

*Primary Examiner* — Idowu O Osifade
(74) *Attorney, Agent, or Firm* — Seed IP Law Group LLP

(57) ABSTRACT

Provided are user equipment and wireless communication methods related to power control of sidelink transmissions and any other sidelink operation in NR V2X. The user equipment, comprising: a receiver, operative to receive indication information of power determination basis for sidelink transmission, the indication information indicating a set of downlink reference signal(s) for determining pathloss used for power control of a sidelink channel to be transmitted by the user equipment or that the pathloss for power control of the sidelink channel is determined based on sidelink reference signal(s); and a circuitry, operative to determine the pathloss used for power control of the sidelink channel based on the indication information.

14 Claims, 11 Drawing Sheets

(51) Int. Cl.
   *H04W 52/38*   (2009.01)
   *H04W 92/18*   (2009.01)

(56) References Cited

U.S. PATENT DOCUMENTS

| | | | |
|---|---|---|---|
| 2018/0176892 A1 | 6/2018 | Kim et al. | |
| 2021/0337485 A1* | 10/2021 | Ryu | H04W 52/247 |
| 2021/0410084 A1* | 12/2021 | Li | H04W 52/265 |
| 2022/0110067 A1* | 4/2022 | Ryu | H04W 24/08 |

OTHER PUBLICATIONS

Motorola Mobility, "Introduction of Enhancements to LTE operation in unlicensed spectrum into 36.213 s14-xx," R1-1804492, 3GPP TSG RAN WG1 Meeting #92bis, Sanya, P.R. China, Apr. 16-20, 2018. (5 pages).

Office Action, dispatched Mar. 6, 2023, for Indian Patent Application No. 202147042738. (6 pages).

3GPP ETSI TS 136.101 V15.5.0, "LTE; Evolved Universal Terrestrial Radio Access (E-UTRA);.User Equipment (UE) radio transmission and reception (Release 15)" Jul. 2019, 1806 pages.

3GPP ETSI TS 136.213 V15.4.0, "LTE; Evolved Universal Terrestrial Radio Access (E-UTRA); Physical layer procedures (Release 15)" May 2019, 551 pages.

International Search Report, dated Jan. 6, 2020, for International Application No. PCT/CN2019/080035, 3 pages.

Samsung, "Discussion on Physical Layer Procedures," R1-1812985, Agenda Item: 7.2.4.1.2, 3GPP TSG RAN WG1 Meeting #95, Spokane, US, Nov. 12-16, 2018, 6 pages.

Samsung, "On Physical Layer Procedures for NR V2X," R1-1901048, Agenda Item: 7.2.4.1.2, 3GPP TSG RAN WG1 Ad-Hoc Meeting 1901, Taipei, Taiwan, Jan. 21-25, 2019, 11 pages.

Convida Wireless, "Discussion on Sidelink Procedures," R1-1903153, Agenda Item: 7.2.4.1.2, 3GPP TSG RAN WG1 Meeting #96, Athens, Greece, Feb. 25-Mar. 1, 2019, 3 pages.

Extended European Search Report, mailed Oct. 3, 2022, for Application No. 19920721.8-1212, 14 pages.

Samsung, "Considerations on Sidelink Power Control," R1-1902286, Agenda Item: 7.2.4.1.5, 3GPP TSG RAN WG1 #96, Athens, Greece, Feb. 25-Mar. 1, 2019, 7 pages.

ZTE, Sanechips, "Discussion on PHY procedures for NR V2X," R1-1900775, Agenda Item: 7.2.4.1.2, 3GPP TSG RAN WG1 Ad-Hoc Meeting 1901, Taipei, Jan. 21-25, 2019, 7 pages.

\* cited by examiner

USER EQUIPMENT AND WIRELESS COMMUNICATION METHOD FOR POWER CONTROL OF SIDELINK CHANNEL TRANSMISSION

BACKGROUND

1. Technical Field

The present disclosure relates to wireless communication field, and in particular, to wireless communication apparatus such as a user equipment (UE) and a base station, and wireless communication methods related to determine power control of sidelink channels or any other sidelink operations in New Radio (NR) access technology.

2. Description of the Related Art

In mode 3 (i.e., base station scheduling) in LTE V2X, the power of Physical Sidelink Shared Channel (PSSCH) is based on pathloss from base station to a user equipment (UE) as well as other parameters like P0 and alpha, and the power of Physical Sidelink Control Channel (PSCCH) is in a fixed relationship with the power of PSSCH.

So far, power control for sidelink transmission in NR V2X is still in a very initial phase and how to decide power determination for sidelink transmission for a user equipment is being discussed.

SUMMARY

One non-limiting and exemplary embodiment facilitates determining parameters (especially pathloss) used for power control of a sidelink channel to be transmitted by a user equipment in NR to optimize the system performance.

In an embodiment of the present disclosure, the techniques disclosed here include a user equipment, comprising: a receiver, operative to receive indication information of power determination basis for sidelink transmission, the indication information indicating a set of downlink reference signal(s) for determining pathloss used for power control of a sidelink channel to be transmitted by the user equipment or that the pathloss for power control of the sidelink channel is determined based on sidelink reference signal(s); and a circuitry, operative to determine the pathloss used for power control of the sidelink channel based on the indication information.

In another embodiment of the present disclosure, the techniques disclosed here is a user equipment, comprising: a receiver, operative to receive a plurality of downlink or sidelink beams; and a circuitry, operative to determine the pathloss used for power control of a sidelink channel based on a set of reference signal(s) associated with the best downlink or sidelink beam determined by the user equipment among the plurality of downlink or sidelink beams.

In another embodiment of the present disclosure, the techniques disclosed here is a wireless communication method for a user equipment, comprising: receiving indication information of power determination basis for sidelink transmission, the indication information indicating a set of downlink reference signal(s) for determining pathloss used for power control of a sidelink channel to be transmitted by the user equipment or that the pathloss for power control of the sidelink channel is determined based on sidelink reference signal(s); and determining the pathloss used for power control of the sidelink channel based on the indication information.

In another embodiment of the present disclosure, the techniques disclosed here is a wireless communication method for a user equipment, comprising: receiving a plurality of downlink or sidelink beams; and determining the pathloss used for power control of a sidelink channel based on a set of reference signal(s) associated with the best downlink or sidelink beam determined by the user equipment among the plurality of downlink or sidelink beams.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
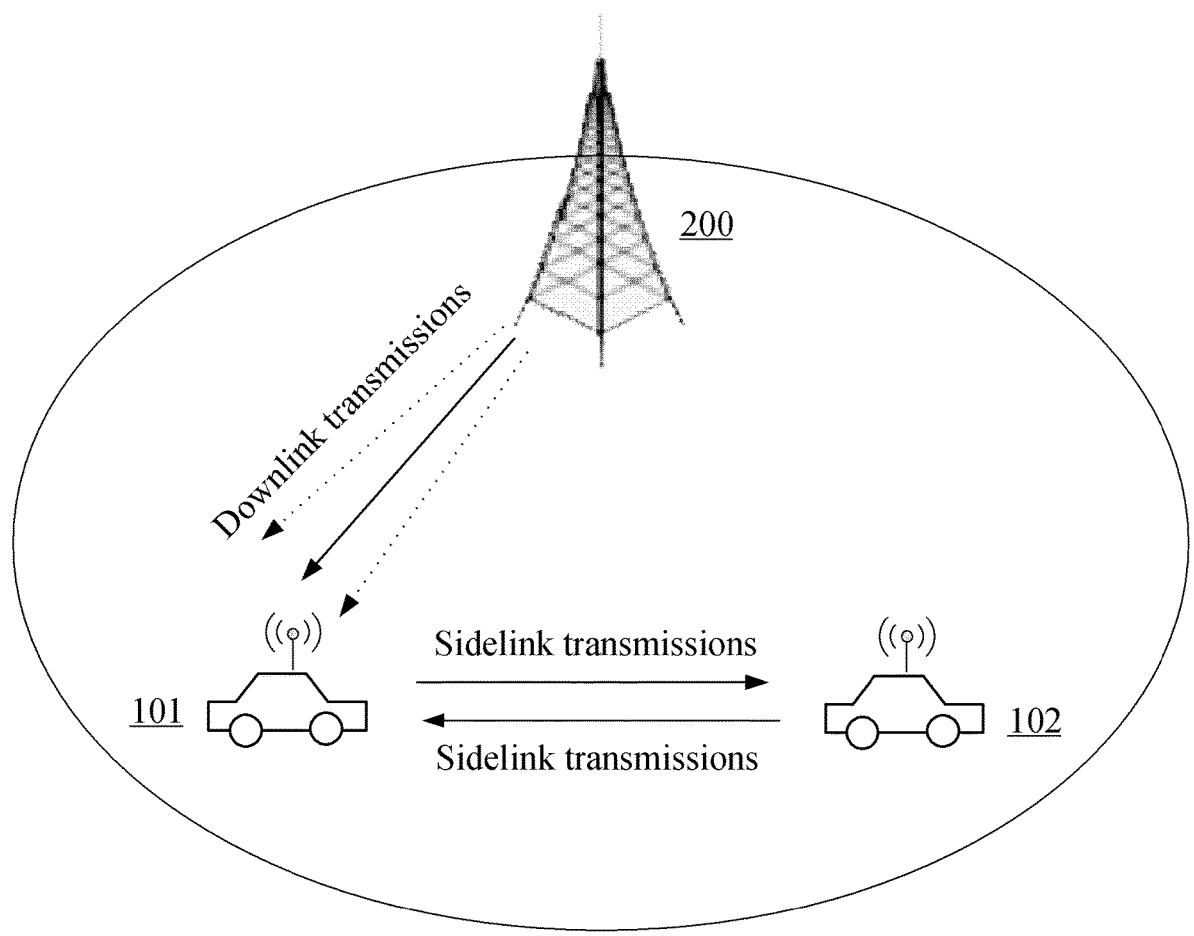
FIG. 1 schematically shows an exemplary scenario of sidelink transmission in NR.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

In NR V2X study item in Release 16, two modes were discussed for resource allocation of sidelink. One mode is mode 1, where sidelink resource allocation is based on gNB scheduling (that is similar to mode 3 in LTE V2X). For mode 1, the typical scenario is that gNB controls the sidelink resource allocation of transmitting UE (Tx UE), which should be in RRC_CONNECTED status. For receiving UE (Rx UE), it can be in any RRC status (e.g., RRC_CONNECTED, RRC_IDLE or RRC_INACTIVE). Another mode is mode 2, where sidelink resource allocation is based on UE autonomous scheduling in principle (that is similar to mode 4 in LTE V2X). Here in mode 2, sub-modes may be included, where sub-modes can include the cases of UE autonomously selecting sidelink resource for transmission; UE assisting sidelink resource selection for other UE(s); UE being configured with NR configured grant (type-1 like) for sidelink transmission, which means RRC based configuration and deactivation/activation of sidelink transmission; and UE scheduling sidelink transmission of other UE(s).

In LTE V2X, for sidelink transmission mode 3, the power of PSSCH is based on pathloss from eNB to UE (e.g. "PL" in following power control formulation) as well as other parameters like P0 and alpha. In particular, the UE transmit power $P_{PSSCH}$ for PSSCH transmission is given by:

$$P_{PSSCH} = 10\log_{10}\left(\frac{M_{PSSCH}}{M_{PSSCH} + 10^{\frac{3}{10}} \times M_{PSCCH}}\right) + \min\left\{P_{CMAX}, 10\log_{10}\left(M_{PSSCH} + 10^{\frac{3}{10}} \times M_{PSCCH}\right) + P_{O\_PSSCH,3} + \alpha_{PSSCH,3} \cdot PL\right\} [dBm] \quad <\text{Equation 1}>$$

where $P_{CMAX}$ is defined in 3GPP TS 36.101: "Evolved Universal Terrestrial Radio Access (E-UTRA); User Equipment (UE) radio transmission and reception" (e.g., Rel. 15.5.0), and $M_{PSSCH}$ is the bandwidth of the PSSCH resource assignment expressed in number of resource blocks and PL=$PL_c$ where $PL_c$ is defined in Subclause 5.1.1.1 of 3GPP TS 36.213 (e.g., Rel. 15.4.0). $P_{O\_PSSCH,3}$ and $\alpha_{PSSCH,3}$ are provided by higher layer parameters pOSL-V2V and alphaSL-V2V, respectively and that are associated with the corresponding PSSCH resource configuration.

UE transmit power $P_{PSCCH}$ for PSCCH transmission has a fix relationship with $P_{PSSCH}$ for PSSCH transmission, and the UE transmit power UE transmit power $P_{PSCCH}$ for PSCCH transmission in sidelink transmission mode 3 in LTE V2X is given by:

$$P_{PSCCH} = 10\log_{10}\left(\frac{10^{\frac{3}{10}} \times M_{PSCCH}}{M_{PSSCH} + 10^{\frac{3}{10}} \times M_{PSCCH}}\right) + \min\left\{P_{CMAX}, 10\log_{10}\left(M_{PSSCH} + 10^{\frac{3}{10}} \times M_{PSCCH}\right) + P_{O\_PSSCH,3} + \alpha_{PSSCH,3} \cdot PL\right\} [dBm] \quad <\text{Equation 2}>$$

where $P_{CMAX}$ is defined in 3GPP TS 36.101: "Evolved Universal Terrestrial Radio Access (E-UTRA); User Equipment (UE) radio transmission and reception" (e.g., Rel. 15.5.0), $M_{PSSCH}$ is the bandwidth of the PSSCH resource assignment expressed in number of resource block, $M_{PSCCH}$=2, and PL=$PL_c$ where $PL_c$ is defined in Subclause 5.1.1.1 of 3GPP TS 36.101 (e.g., Rel. 15.4.0). $P_{O\_PSSCH,3}$ and $\alpha_{PSSCH,3}$ are provided by higher layer parameters pOSL-V2V and alphaSL-V2V, respectively and that are associated with the corresponding PSSCH resource configuration.

However, for NR sidelink, how to determine the power control is still unclear. For example, for downlink, there may be multiple downlink RSs associated with different beams, and which downlink RS (or beam) is used for power control determination is to be studied. Further, power control based on sidelink path between Tx UE and Rx UE may also need to be supported.

The present disclosure is provided in view of the above. However, the present disclosure can also be applied to other D2D communications in addition to V2X. In addition, please note that although the below embodiments may be described as in NR sidelink mode 1 or NR sidelink mode 2, yet without being specified they can apply to both NR sidelink mode 1 and mode 2, or any other suitable mode specified in the further release.

FIG. 1 schematically shows an exemplary scenario of sidelink transmission in NR. As shown in FIG. 1, the gNB 200 can transmit downlink signals to a vehicle 101 through Downlink transmission. The downlink signals can be for example RS, control information such as DCI, etc. There may be one or more beams for downlink transmission from gNB 200 to vehicle 101, and each beams can have respective downlink RS. Further, signal transmission can also be transmitted from the vehicle 101 to another vehicle 102 via sidelink as shown by two oppositely directed arrows noted as "Sidelink transmissions". Here, vehicle 101 can be any user equipment as appropriately selected and the term "vehicle" should not be considered as a limitation. Further, multiple beams from gNB 200 to vehicle 101 or between vehicle 101 and 102 may be supported.

For example, in an embodiment, the gNB 200 may transmit PDCCH and PDSCH to the vehicle 101 as Downlink transmission, and the vehicle 101 transmits PUCCH and PUSCH to the gNB 200. The vehicle 101 and 102 can also transmit PSSCH, PSCCH and/or PSFCH as sidelink transmissions to each other.

Figure 2:
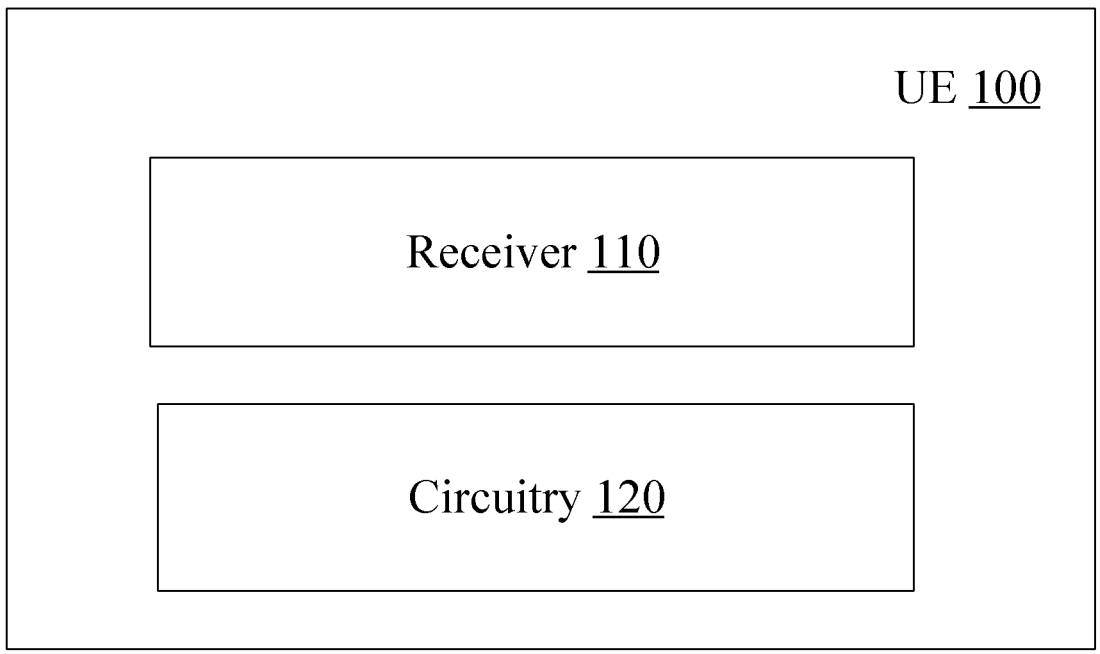
FIG. 2 illustrates a block diagram of details of a user equipment in a case of power control of sidelink transmission according to an embodiment of the present disclosure.

Details of vehicle 101 can be referring to FIG. 2. FIG. 2 illustrates a block diagram of details of a UE 100 (e.g., vehicle 101 and 102) in a case of power control of sidelink transmission according to an embodiment of the present disclosure. In particular, UE 100 can comprise a receiver 110 and a circuitry 120. The receiver 110 is operative to receive indication information of power determination basis for sidelink transmission, wherein the indication information indicates a set of downlink RS for determining pathloss used for power control of a sidelink channel to be transmitted by the user equipment, or the indication information indicates that the pathloss used for power control of the sidelink channel is determined based on sidelink RS. The circuitry 120 is operative to determine the pathloss used for power control of the sidelink channel based on the indication information. Here, a set of downlink RS can comprise one or more downlink RS.

For example, gNB 200 in FIG. 1 can dynamically indicate indication information (e.g., through Downlink Control Information (DCI) or Medium Access Control-Control Element (MAC-CE)) to vehicle 101. The indication information can be directed towards specific downlink RS on which the determination of pathloss used for power control of a certain sidelink channel is based (i.e., one determination basis), or the indication information can also indicate that the pathloss used for power control of the sidelink channel is determined based on sidelink RS (i.e., another determination basis). In an embodiment of the present disclosure, the gNB 200 can also indicate indication information semi-dynamically (e.g., through Radio Resource Control (RRC) information).

In the case of the indication information indicating that the pathloss used for power control of the sidelink channel is determined based on sidelink RS, the vehicle 101 can then decide which specific sidelink RS to be used for determining pathloss used for power control of the sidelink channel based on for example the implementation of the vehicle 101, when there are multiple sidelink RS associated with difference sidelink beams from another UE, for example, vehicle 102 (i.e., beam sweeping), or from multiple UEs (i.e., groupcast). Here "specific downlink RS" and "specific sidelink RS" can be a specific combination of multiple downlink RS or sidelink RS.

With the configuration of the above embodiment, the present invention achieves an advantage of indicating reference signal(s) or power determination basis for pathloss used for the purpose of power control determination of a sidelink channel, for the cases where there are more than one reference signals (or more than one beams) existing with the flexibility for gNB to control UE's power based on different purpose.

In an embodiment, the power control of the user equipment is performed differently for different resource allocation modes. For example, the power control of the UE for NR mode 1 is performed differently from the power control of the UE for NR mode 2. With the configuration of the above embodiment, the present invention achieves an advantage of optimizing power control for UE in different modes.

In an embodiment, the set of downlink RS can comprise Primary Synchronization Signal (PSS), Secondary Synchronization Signal (SSS) and/or Channel State Information-Reference Signals (CSI-RS). Please note that any other downlink RS can also be selected as appropriate. And in an embodiment, the PSS, SSS and/or CSI-RS can be from one or more downlink beams.

In an embodiment, the indication information indicates the power determination basis for sidelink transmission by an index through a DCI, and the association of the power determination basis for sidelink transmission with the index is configured through RRC information, pre-configured or specified. For example, the indication information can indicate the power determination basis for sidelink transmission by a 2-bit field through a DCI, as shown in Table 1 below:

TABLE 1

| Code point | Interpretation |
| --- | --- |
| Index 1 | downlink RS 1 |
| Index 2 | downlink RS 2 |
| Index 3 | downlink RS 3 |
| Index 4 | based on sidelink RS |

With the configuration of the above embodiment, the present invention achieve an advantage of dynamic power control based on different purpose, with less indication information (i.e., merely the index) needed to be transmitted from gNB to the UE via downlink transmission, thereby saving the downlink transmission resource.

In the embodiment of Table 1, all or some of the sidelink paths use the same power determination basis. However, the power determination basis for sidelink transmission can also be separately determined by the indication information. In an embodiment, the indication information can indicate the power determination basis for sidelink transmission of each single sidelink channel by every 2-bit field through a DCI as shown in Table. 1. For example, the first two bits of the indication information can indicate power determination basis for PSSCH as shown in Table. 1, the second two bits of the indication information can indicate power determination basis for PSCCH, and third two bits of the indication information can indicate power determination basis for PSFCH.

In addition, In the case where the power determination basis for sidelink transmission can be separately determined, an index is not limited to correspond to a downlink RS/the case where the pathloss is merely determined based on the sidelink RS or every 2-bit is used for interpretation of a sidelink channel, but can also correspond to a combination of RS assignment for different sidelink channels. For example, the indication information can indicate the power determination basis for sidelink transmission by a 2-bit field through a DCI as shown in Table 2 below:

TABLE 2

| Code point | Interpretation |
| --- | --- |
| Index 1 | downlink RS 1 for PSSCH and downlink RS 2 for PSCCH |
| Index 2 | downlink RS 1 for PSSCH and downlink RS 3 for PSCCH |
| Index 3 | downlink RS 2 for PSSCH and downlink RS 3 for PSCCH |
| Index 4 | downlink RS 1 for PSSCH and "based on sidelink RS" for PSCCH |

In the above examples, the mapping between each index to the power determination basis can be configured through RRC configuration, pre-configured in the user equipment or specified in accordance with the standard or any combination thereof.

In the example illustrated in Table 2, the indication information indicates power determination basis for sidelink transmission separately for PSCCH and PSSCH. That is to say, the reference signal(s) for determining pathloss used for power control of PSCCH and PSSCH can be different reference signal(s) or a different combination of reference signal(s). In still another embodiment, the indication information can indicate power determination basis for sidelink transmission of Physical Sidelink Feedback Channel (PSFCH) separately from power determination basis of sidelink transmission for PSCCH and PSSCH. It is noted that the indication formation may indicate the same power determination basis for any two or three of PSCCH, PSSCH and PSFCH, even in the case where the indication information indicates power determination separately for each sidelink channel.

Please note that the term of "2-bit field" mentioned in the embodiments of the present invention should not be considered as a limitation. Specifically, the indication information can indicate the power determination basis for sidelink transmission by any number of bits field as appropriately selected. Further, the indication information can indicate the power determination basis for sidelink transmission of each single sidelink channel by every N-bit field and N can also be selected as appropriate. Alternatively, the indication information can indicate the power determination basis for a first sidelink channel by the first $N_1$-bit field, indicate the power determination basis for a second sidelink channel by the next $N_2$-bit field ..., wherein $N_1$, $N_2$ ... can be the same or different.

With the configuration of the above embodiment, the present invention achieves an advantage of a better flexibility on power control on different channels (especially for sidelink channels), since different channels can have a different power determination basis with each other, and in addition, for the example of Table 2, the usage of index allows less indication information (i.e., merely one index indicating power determination basis for multiple sidelink channels) needed to be transmitted from gNB to the UE via downlink transmission.

In still another embodiment, pathloss used for power control of PSCCH and pathloss used for power control of PSSCH are in a fixed relationship, even in the case where the indication information indicates the same power determination basis (e.g., the same downlink RS) for PSCCH and PSSCH.

For example, the pathloss of PSCCH=pathloss of PSSCH+offset. Here the offset can be a constant, and be configured by gNB via RRC signaling, pre-configured in the UE, or specified in accordance with the standard.

With the configuration of the above embodiment, the present invention can rely on less reference signal for power control of multiple sidelink channels while difference on the reference signals for power control among different channels can also be reflected, thereby allowing a simpler UE behavior and flexibly on power control of different sidelink channels as well as saving indication overhead.

Figure 3:
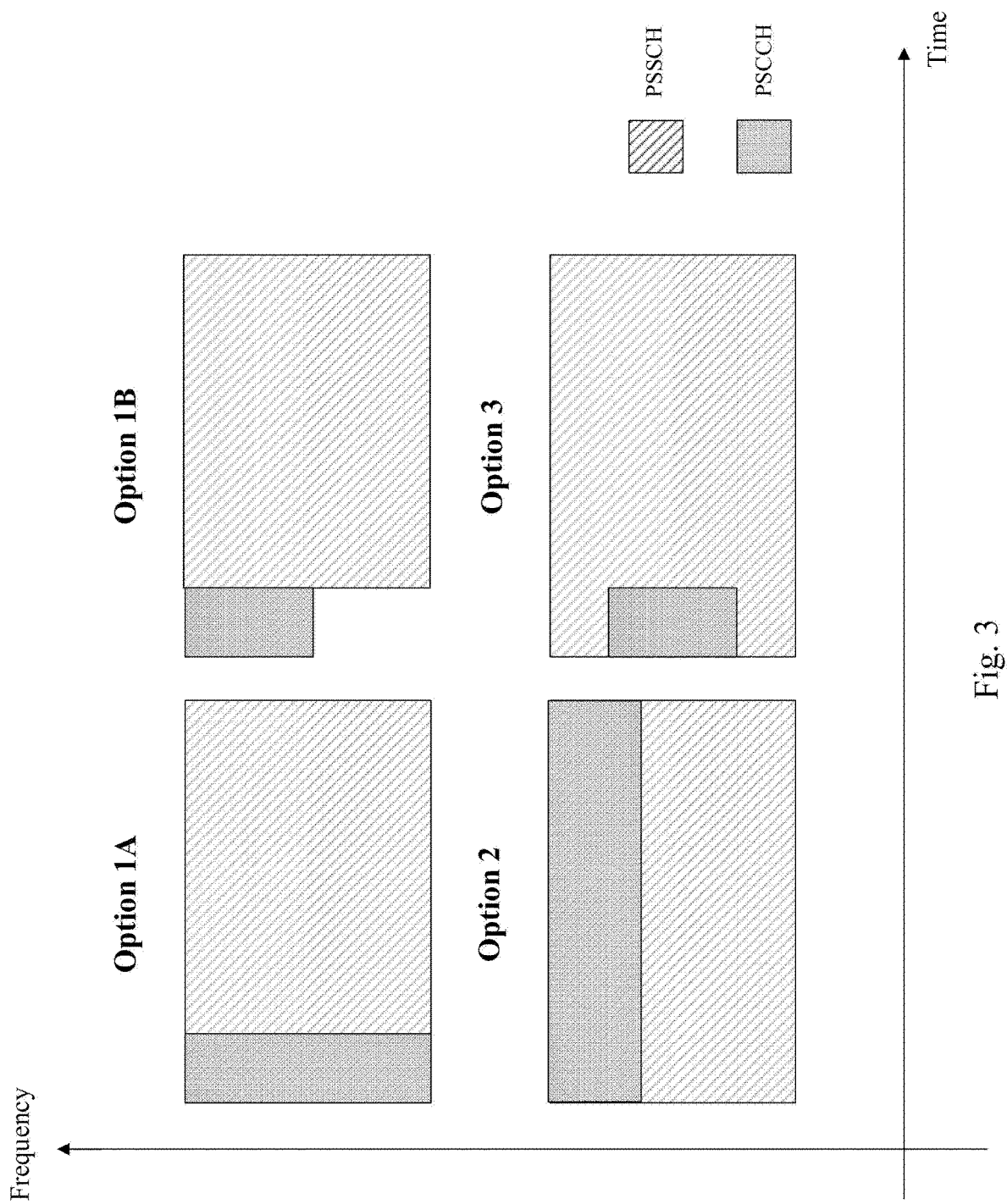
FIG. 3 schematically shows options of exemplary scenarios of sidelink transmission for a user equipment according to an embodiment of the present disclosure.

The applications of the above embodiments will be discussed with reference to FIG. 3. FIG. 3 schematically shows options of exemplary scenarios of sidelink transmission for a user equipment according to an embodiment of the present disclosure. As shown in FIG. 3, Option 1A, Option 1B and Option 3 of PSSCH/PSCCH multiplexing are all concerning the cases where PSCCH and PSSCH are time division multiplexing (TDM). In Option 1B, the PSCCH and PSSCH are TDM and have different bandwidths. In the case, the embodiment of PSCCH and PSSCH determining power control based on separate determination of power determination basis according to the present invention can apply.

With the above embodiment, for the case of different coverage for different channel, the present invention can flexibly indicate power determination basis for each channel while saving transmission resource of downlink channel.

For the case of Option 3 shown in FIG. 3, the embodiment of PSCCH and PSSCH determining power control based on the same RS according to the present invention can apply. With the embodiment of PSCCH and PSSCH determining power control based on the same power determination basis according to the present invention, a constant power for symbols including or not including PSCCH can be achieved.

With the configuration of the above embodiment, the present invention can keep a constant power for symbols including or not including PSCCH.

Figure 4:
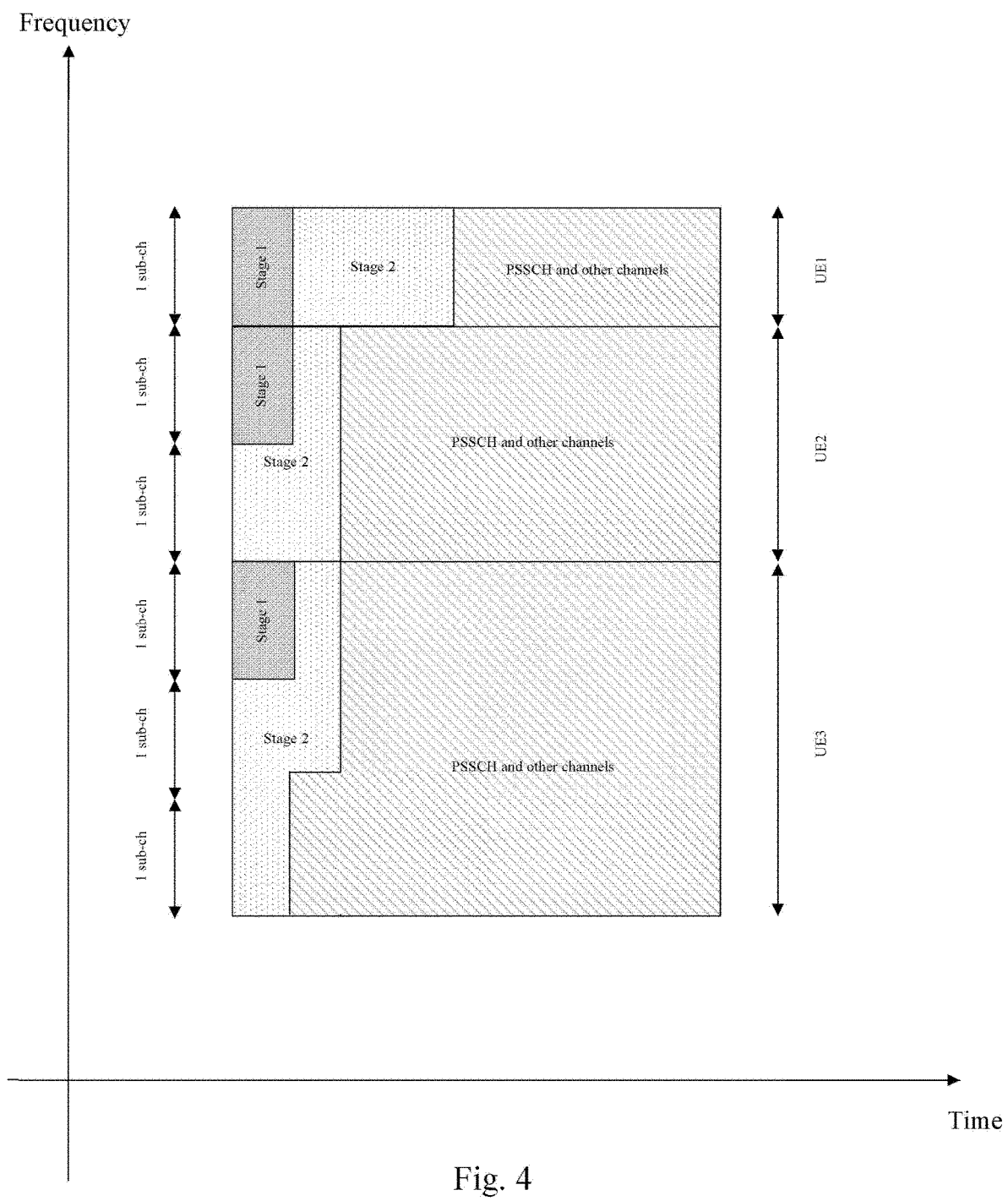
FIG. 4 schematically shows another exemplary scenario of sidelink transmission for a user equipment according to an embodiment of the present disclosure.

Additional applications of the above embodiments will be discussed with reference to FIG. 4. FIG. 4 schematically shows another exemplary scenario of sidelink transmission for a user equipment according to an embodiment of the present disclosure. In particular, two stage Sidelink Control information (SCI) is shown in this scenario, wherein, the SCI in the first stage is used for indicating broadcast and sensing, and the SCI in the second stage is used for indicating unicast/groupcast-specific information. In this scenario, for example, PSSCH and PSCCH carrying the SCI in the first stage determine power control based on the same power determination basis, while PSSCH and PSCCH carrying the SCI in the second stage determine power control based on different power determination basis. Alternatively, PSSCH and PSCCH carrying the SCI in the first stage and second stage determine power control based on different power determination basis.

With the above embodiment, the present invention could achieve different coverage for different sidelink channels, which allows flexibly power control for individual sidelink channel as needed.

In an embodiment, parameters in addition to pathloss, such as P0 and alpha as defined related to Equation 1 or 2, can also be used for power control of a sidelink channel, which can be configured, preconfigured, or associated with the pathloss used for power control of the sidelink channel. P0 represents a target value of receiving SINR, and alpha represents coefficient of pathloss. For example, the parameters of $P_{O\_PSSCH,3}$ and $\alpha_{PSSCH,3}$ in the Equation 1 and 2 can be configured by gNB, pre-configured in the UE or specified in accordance to the standard. That is to say that the parameters of $P_{O\_PSSCH,3}$ and $\alpha_{PSSCH,3}$ are common to all beams or RS used to determine the pathloss. In another example, parameters other than pathloss, such as P0 and alpha, used for power control of a sidelink channel are associated with power determination basis for sidelink transmission (e.g., a specific downlink RS) used for the determination of pathloss. In this way, once the power determination basis for sidelink transmission is indicated by, for example DCI, a combination of pathloss, P0 and alpha used for power control of a sidelink channel to be transmitted is selected. It is noted that the power control for sidelink transmission can use the same or similar equations to Equation 1 or 2, or can use a different equation with the parameter of pathloss and optionally the parameters of P0 and alpha.

Now refer back to FIG. 1, the vehicle 101 can also transmit indication information for indicating power determination basis of vehicle 102 to the vehicle 102. Specifically referring to FIG. 2, a UE 100 (e.g., vehicle 102) comprises a receiver 110 and circuitry 120, wherein the receiver 110 is operative to receive indication information of power determination basis for sidelink transmission, the indication information indicating a set of sidelink reference signal(s) for determining pathloss used for power control of a sidelink channel to be transmitted by the user equipment; and the circuitry 120 is operative to determine the pathloss used for power control of the sidelink channel based on the indication information.

In an embodiment, the indication information is transmitted through Sidelink Control Information (SCI). In still another embodiment, the sidelink channel is Physical Sidelink Feedback Channel (PSFCH). With the configuration of the above embodiment, the power control of certain sidelink channels (e.g., PSFCH) of the receiving UE can be determined in a more flexibly way as each time transmitting UE transmitting sidelink data to the receiving UE, even when both UE are in RRC_IDLE mode.

In another embodiment, with reference to FIG. 1, the vehicle 101 for example may not receive indication information from gNB regarding the power determine basis for sidelink transmission (e.g., when UE is in RRC_IDLE mode). In this case, the vehicle 101 can determine RS for pathloss by its own. Specifically referring to FIG. 2, in an embodiment, a UE 100 comprising a receiver 110 and a circuitry 120, wherein, the receiver 110 is operative to receive a plurality of downlink or sidelink beams, and the circuitry 120 is operative to determine the pathloss used for power control of a sidelink channel based on a set of reference signal(s) associated with the best downlink or sidelink beam determined by the user equipment among the plurality of downlink or sidelink beams.

To be more specific, in an embodiment, the receiver 110 of the UE 100 can receive a plurality of downlink beams from gNB. Then the circuitry 120 of the UE 100 can determine the pathloss used for power control of a sidelink channel based on a set of reference signal(s) associated with the best downlink beam determined by the UE among the plurality of downlink beams.

In another embodiment, the receiver 110 of the UE 100 can receive a plurality of sidelink beams from another UE. Then the circuitry 120 of the UE 100 can determine the pathloss used for power control of a sidelink channel based on a set of reference signal(s) associated with the best sidelink beam determined by the UE among the plurality of sidelink beams received from the another UE.

With the configuration of the above embodiment, the present invention allows UE achieving power determination basis selection in the case where no indication information is received from the gNB, and optimization can also be achieved based on the practical information on the beams. Further, autonomous determination of the UE when UE is in RRC_IDLE mode on the power determination basis can be realized.

In an embodiment, the best downlink beam is the best beam for receiving Synchronization Signal Block (SSB) measured by the user equipment in a specific time window; or the best sidelink beam is the best beam according to a beam management between the UE (e.g., vehicle 101) and another UE (e.g., vehicle 102) communicating with the UE 100. Here, the specific time window can be configured by gNB, pre-configured in the UE or specified in accordance with the standard.

Please note that the "indication information" in the present disclosure is not necessarily the latest indication information transmitted from the gNB or another UE. For example, in the case that the indication information for the following sidelink transmissions is not appropriately received by the UE, then the UE can for example use the indication information that is received from the last transmission of, for example, DCI from gNB. Please also note that the default power determination basis can be in various form (e.g., downlink RS associated with the best beam or RRC configuration) and not limited to the above examples.

Figure 5A:
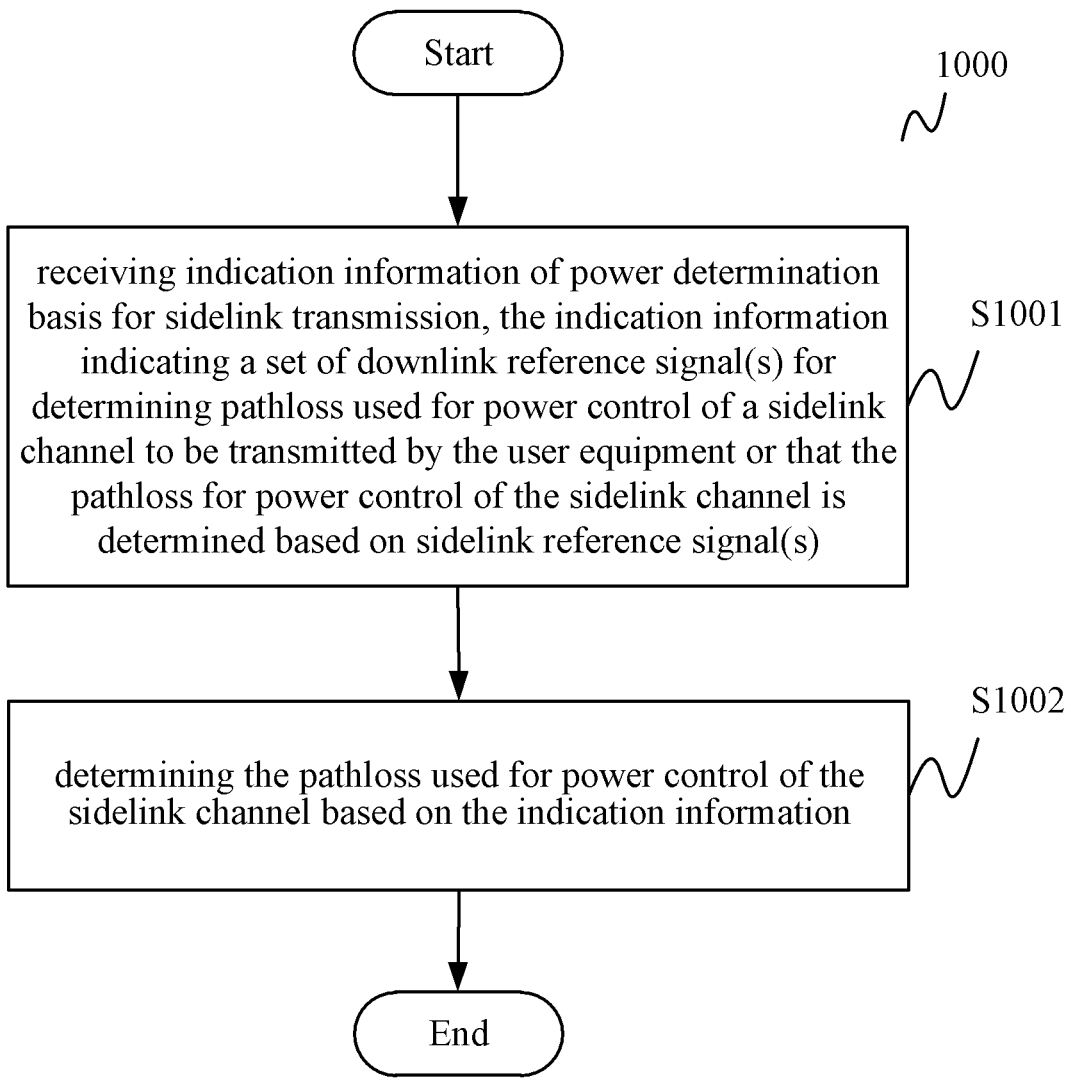
FIG. 5A illustrates a flowchart of a wireless communication method performed by a user equipment according to an embodiment of the present disclosure.

FIG. 5A illustrates a flowchart of a wireless communication method performed by a user equipment according to an embodiment of the present disclosure.

As shown in FIG. 5A, the wireless communication method performed by a user equipment starts at a step S1001 of receiving indication information of power determination basis for sidelink transmission, the indication information indicating a set of downlink reference signal(s) for determining pathloss used for power control of a sidelink channel to be transmitted by the user equipment or that the pathloss for power control of the sidelink channel is determined based on sidelink reference signal(s).

Then, at a step S1002, the UE determines the pathloss used for power control of the sidelink channel based on the indication information. Here, the UE can be the UE 100 as shown in FIG. 2 or the vehicle 101 as shown in FIG. 1. Similar advantages associated with the above embodiment of UE 100 or vehicle 101 can also be achieved, with details omitted.

In an embodiment, the UE can receive the indication information (e.g., through Downlink Control Information (DCI) or Medium Access Control-Control Element (MAC-CE)). The indication information can be directed towards specific downlink RS on which the determination of pathloss used for power control of a certain sidelink channel is based (i.e., one determination basis), or the indication information can also indicate that the pathloss used for power control of the sidelink channel is determined based on sidelink RS (i.e., another determination basis). In an embodiment of the present disclosure, the indication information can be transmitted to the UE through Radio Resource Control (RRC) information.

In the case of the indication information indicating that the pathloss used for power control of the sidelink channel is determined based on sidelink RS, the UE can then decide which specific sidelink RS to be used for determining pathloss used for power control of the sidelink channel based on for example the implementation of the UE, when there are multiple sidelink RS associated with difference sidelink beams from another UE (i.e., beam sweeping), or from multiple UEs (i.e., groupcast). Here "specific downlink RS" and "specific sidelink RS" can be a specific combination of multiple downlink RS or sidelink RS.

Figure 5B:
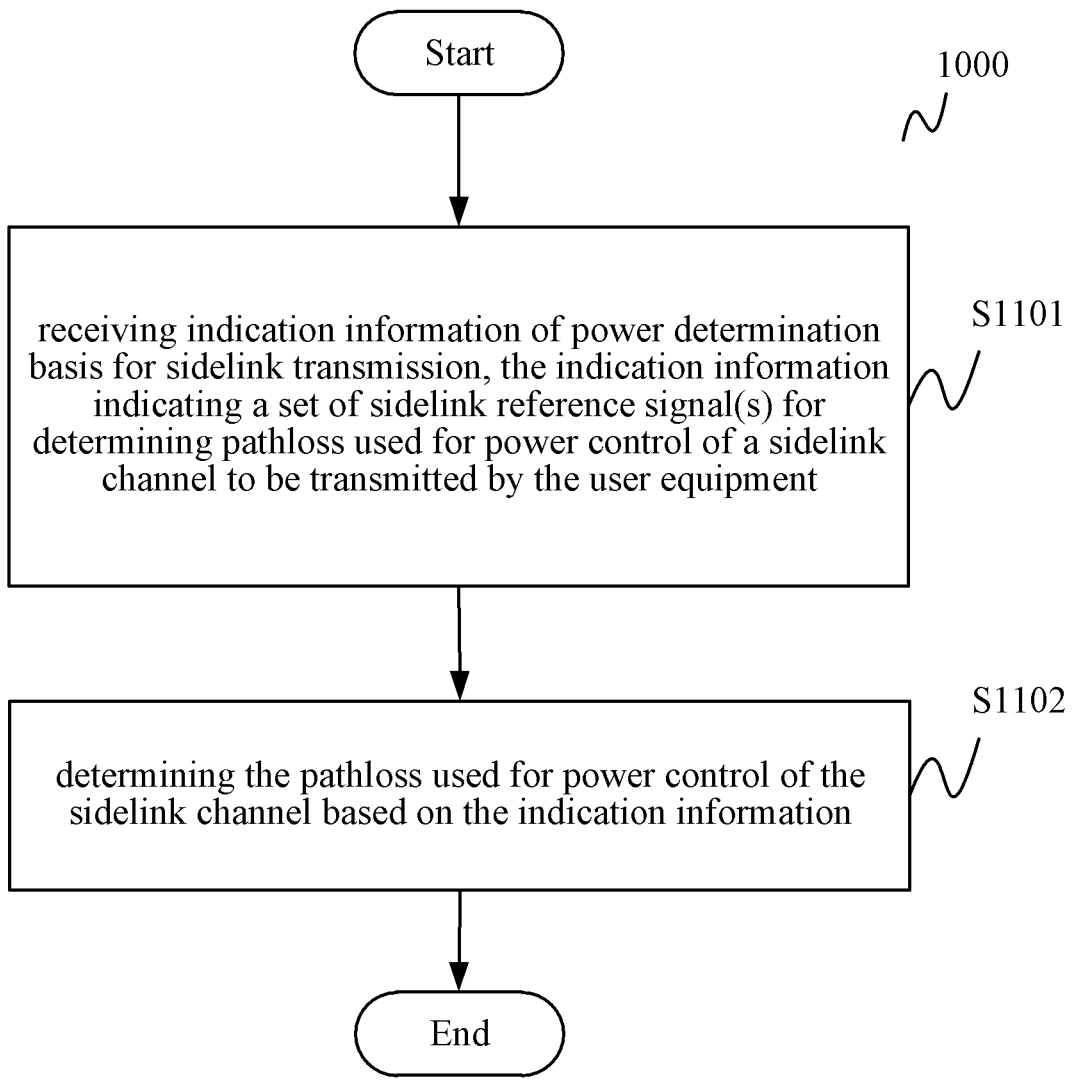
FIG. 5B illustrates a flowchart of a wireless communication method performed by a user equipment according to an embodiment of the present disclosure.

FIG. 5B illustrates a flowchart of a wireless communication method performed by a user equipment according to an embodiment of the present disclosure.

As shown in FIG. 5B, the wireless communication method performed by a user equipment starts at a step S1101 of receiving indication information of power determination basis for sidelink transmission, the indication information indicating a set of downlink reference signal(s) for determining pathloss used for power control of a sidelink channel to be transmitted by the user equipment.

Then, at a step S1102, the UE determines the pathloss used for power control of the sidelink channel based on the indication information. Here, the UE can be the UE 100 as shown in FIG. 2 or the vehicle 102 as shown in FIG. 1. Similar advantages associated with the above embodiment of UE 100 or vehicle 102 can also be achieved, with details omitted.

In an embodiment, the UE can receive the indication information (e.g., through SCI. The indication information can be directed towards specific sidelink RS on which the determination of pathloss used for power control of a certain sidelink channel is based (i.e., one determination basis). In an embodiment of the present disclosure, sidelink channel for which the power control is performed is a PSFCH.

In an embodiment, the UE can then decide which specific sidelink RS to be used for determining pathloss used for power control of the sidelink channel based on for example the implementation of the UE, when there are multiple sidelink RS associated with difference sidelink beams from another UE (i.e., beam sweeping), or from multiple UEs (i.e., groupcast). Here "specific sidelink RS" can be a specific combination of multiple sidelink RS.

Figure 6:
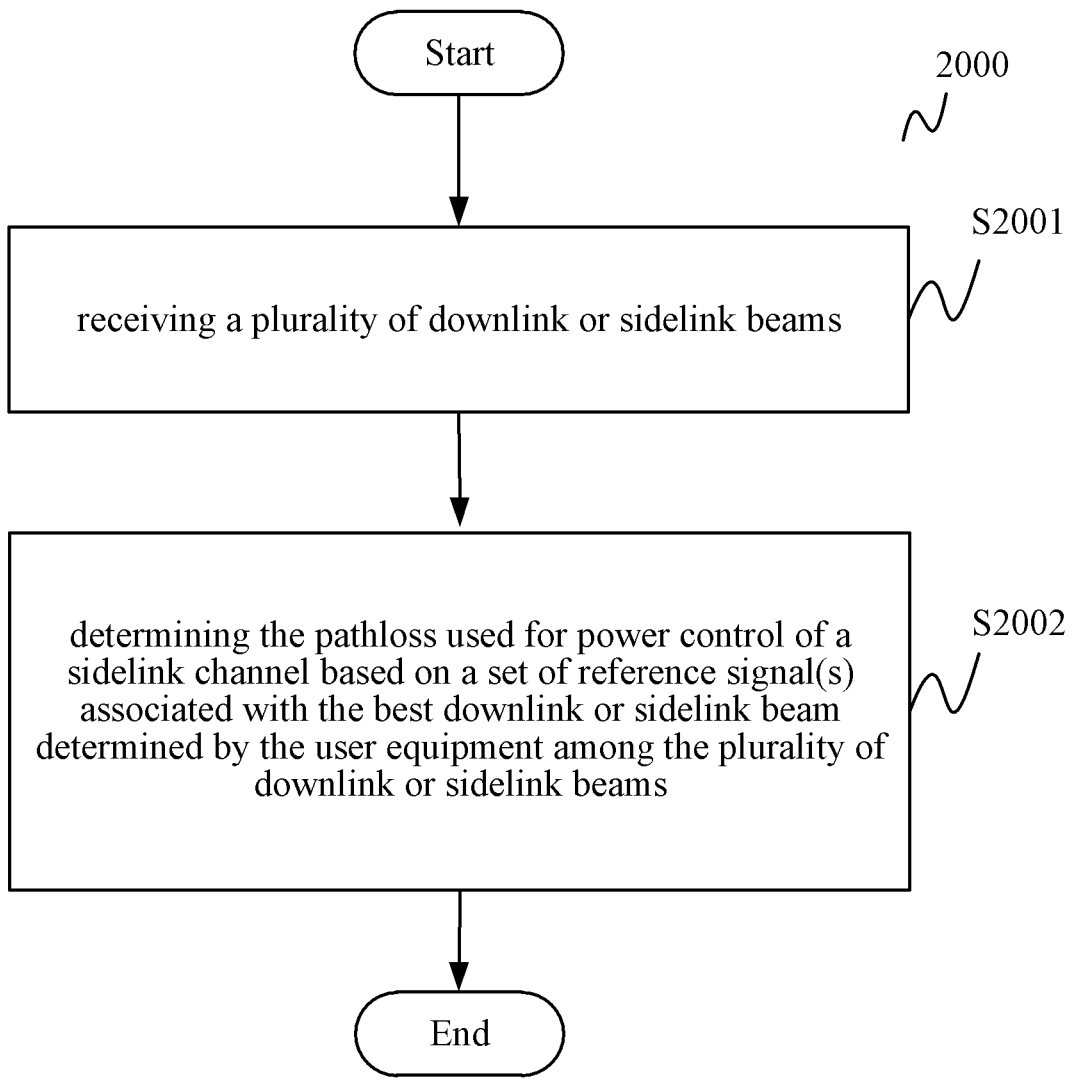
FIG. 6 illustrates a flowchart of a wireless communication method for a user equipment according to another embodiment of the present disclosure.

FIG. 6 illustrates a flowchart of a wireless communication method 2000 for a user equipment according to another embodiment of the present disclosure.

As shown in FIG. 6, the wireless communication method performed by a UE starts at a step of ST2001 of receiving a plurality of downlink or sidelink beams. Here, each downlink or sidelink beam can be associated with a set of downlink RS or a set of sidelink RS. Here, the UE can be the UE 100 as shown in FIG. 2 or the vehicle 101 as shown in FIG. 1. Similar advantages associated with the above embodiment of UE 100 or vehicle 101 can also be achieved, with details omitted.

Then, at a step of S2002, the UE determines the pathloss used for power control of a sidelink channel based on a set of RS associated with the best downlink or sidelink beam determined by the UE among the plurality of downlink beams or sidelink beams.

In an embodiment, if the pathloss used for the power control of a sidelink channel is determined based on the best downlink beam (e.g., in mode 1), then the best downlink beam is the best beam for receiving Synchronization Signal Block (SSB) measured by the UE in a specific time window; if the power used for the power control of a sidelink channel is determined based on the best sidelink beam (e.g., in mode 2), then the best sidelink beam is the best beam according to a beam management between the UE and another UE communicating with the UE.

In an embodiment, if there is not beam management for the case of the pathloss used for the power control of a sidelink channel being determined based on the best sidelink, then which reported reference signal received power received from another UE will be used for pathloss is based on the implementation of the UE.

Figure 7A:
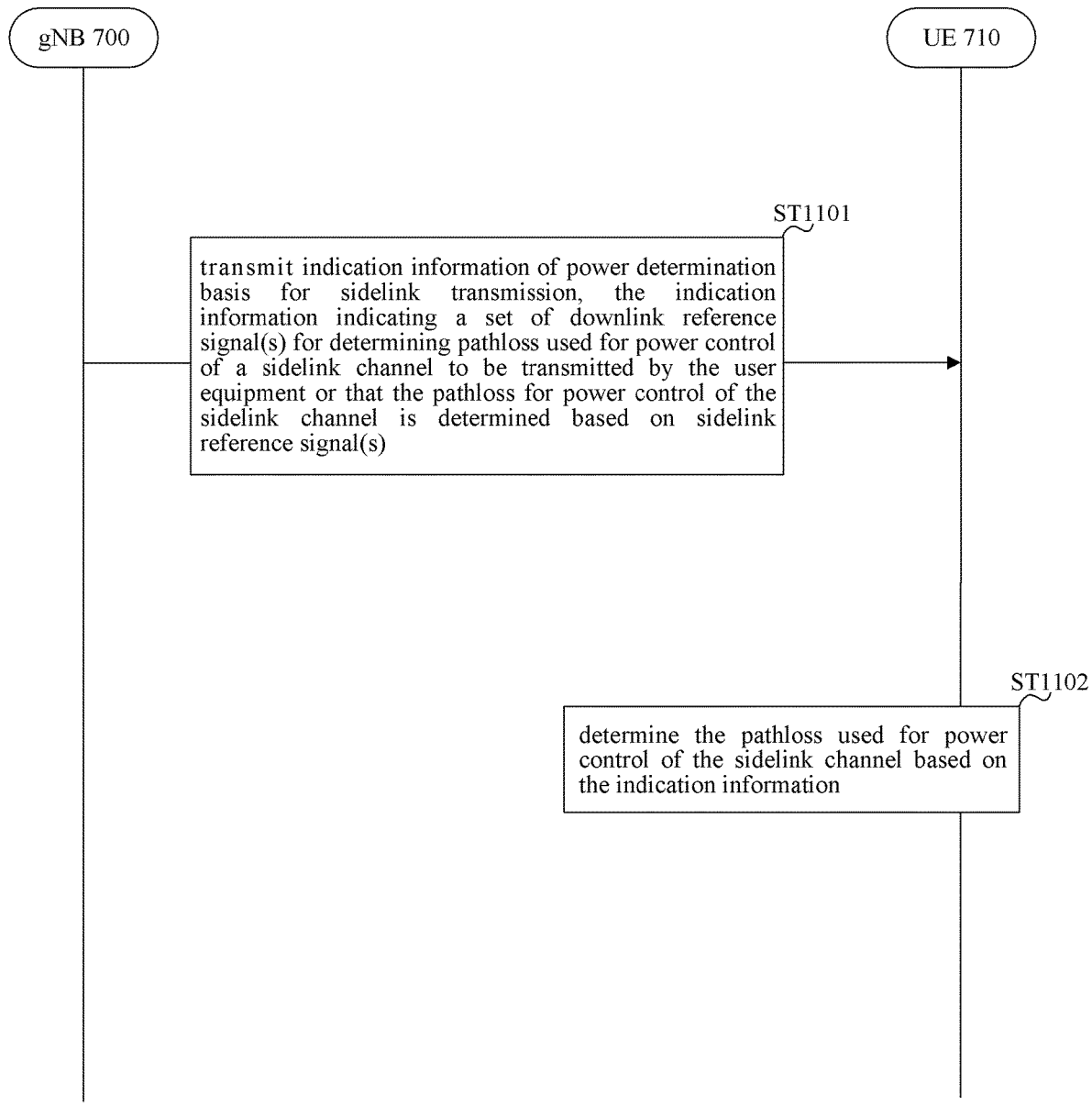
FIG. 7A schematically shows an example of a flowchart of communication between a base station and a user equipment according to an embodiment of the present disclosure.

FIG. 7A schematically shows an example of a flowchart of communication between a base station and a user equipment according to an embodiment of the present disclosure. In particular, an example of a flowchart of communication method between a gNB 700 and a UE 710 according to an embodiment of the present disclosure is shown. The UE 710 can for example be the UE 100 as shown in FIG. 2 or the vehicle 101 as shown in FIG. 1, and the gNB 700 can for example be the gNB 200 as shown in FIG. 1. Similar advantages associated with the above embodiment of UE 100 or vehicle 101 can also be achieved, with details omitted.

As shown in FIG. 7A, at a step ST 1101, the gNB 700 can transmit indication information of power determination basis for sidelink transmission to UE 710, the indication information indicating a set of downlink reference signal(s) for determining pathloss used for power control of a sidelink channel to be transmitted by the user equipment or that the pathloss for power control of the sidelink channel is determined based on sidelink reference signal(s). In response, the UE 710 can receive the indication information from the gNB 700. Here, a set of downlink RS can comprise one or more downlink RS. The UE 710 can be the UE 100 as shown in FIG. 2 or the vehicle 101 as shown in FIG. 1.

Once the UE 710 receive the indication information from the gNB 700, then, UE 710 at a step ST 1102 can determine the pathloss used for power control of the sidelink channel based on the indication information. Specifically, the UE 710 could determine the pathloss used for power control of the sidelink channel based on specific set of downlink RS, or sidelink RS with further determination of specific set of sidelink RS to be used, as indicated by the indication information.

For example, gNB 700 in FIG. 7A can dynamically indicate indication information (e.g., through Downlink Control Information (DCI) or Medium Access Control-Control Element (MAC-CE)) to UE 710. The indication information can be directed towards specific downlink RS on which the determination of pathloss used for power control of a certain sidelink channel is based (i.e., one determination basis), or the indication information can also indicate that the pathloss used for power control of the sidelink channel is determined based on sidelink RS (i.e., another determination basis). In an embodiment of the present disclosure, the gNB 700 can also indicate indication information semi-dynamically (e.g., through Radio Resource Control (RRC) information).

In the case of the indication information indicating that the pathloss used for power control of the sidelink channel is determined based on sidelink RS, the UE 700 can then decide which specific sidelink RS to be used for determining pathloss used for power control of the sidelink channel based on for example the implementation of the UE 700, when there are multiple sidelink RS associated with difference sidelink beams from another UE, for example, vehicle 102 (i.e., beam sweeping), or from multiple UEs (i.e., groupcast). Here "specific downlink RS" and "specific sidelink RS" can be a specific combination of multiple downlink RS or sidelink RS.

Figure 7B:
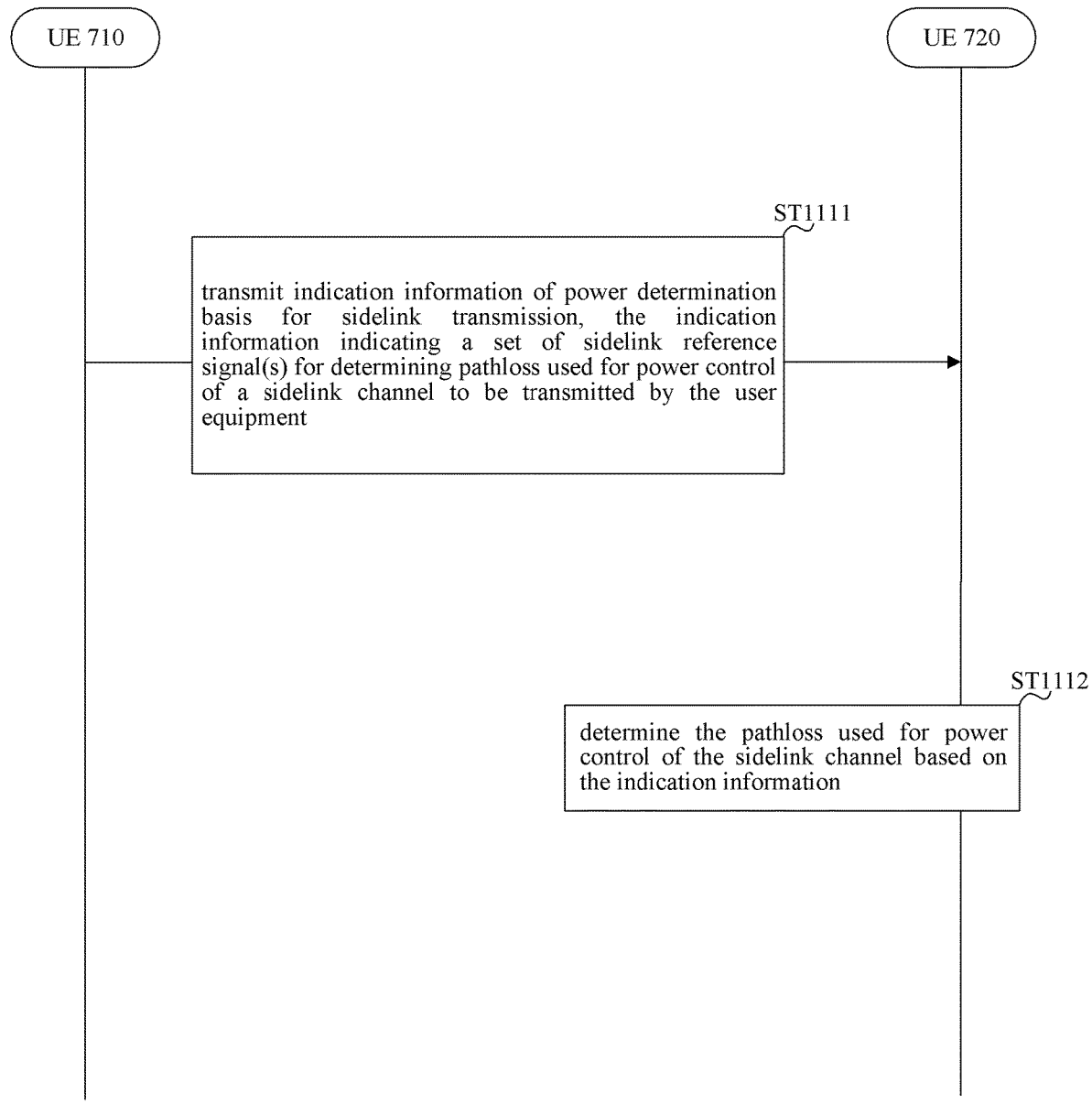
FIG. 7B schematically shows an example of a flowchart of communication between a user equipment and another user equipment according to an embodiment of the present disclosure.

As shown in FIG. 7B, at a step ST 1111, the UE 710 can transmit indication information of power determination basis for sidelink transmission to UE 720, the indication information indicating a set of sidelink reference signal(s) for determining pathloss used for power control of a sidelink channel to be transmitted by the user equipment. In response, the UE 720 can receive the indication information from the UE 710. Here, a set of downlink RS can comprise one or more downlink RS. The UE 720 can be the UE 100 as shown in FIG. 2 or the vehicle 102 as shown in FIG. 1.

Once the UE 720 receive the indication information from the UE 710, then, UE 720 at a step ST 1112 can determine the pathloss used for power control of the sidelink channel based on the indication information. Specifically, the UE 720 could determine the pathloss used for power control of the sidelink channel based on specific set of sidelink RS as indicated by the indication information.

For example, UE 710 in FIG. 7B can dynamically indicate indication information (e.g., through SCI) to UE 720. The indication information can be directed towards specific sidelink RS on which the determination of pathloss used for power control of a certain sidelink channel is based. In an embodiment of the present disclosure, sidelink channel for which the power control is performed is a PSFCH.

In an embodiment, the UE can then decide which specific sidelink RS to be used for determining pathloss used for power control of the sidelink channel based on for example the implementation of the UE, when there are multiple sidelink RS associated with difference sidelink beams from another UE (i.e., beam sweeping), or from multiple UEs (i.e., groupcast). Here "specific sidelink RS" can be a specific combination of multiple sidelink RS.

Figure 8:
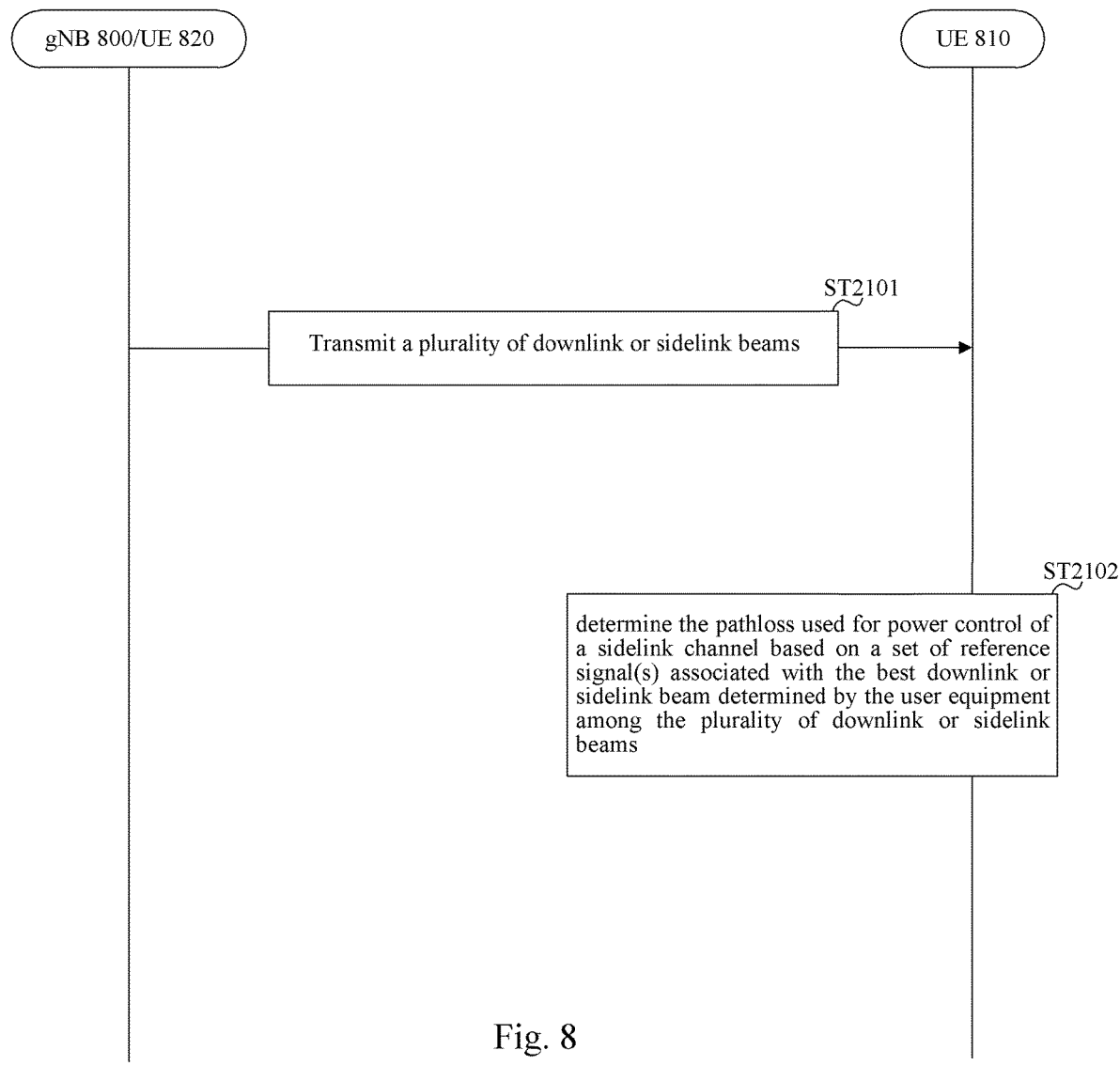
FIG. 8 schematically shows an example of a flowchart of communication between a base station/a user equipment and another user equipment according to another embodiment of the present disclosure.

FIG. 8 schematically shows an example of a flowchart of communication between a base station/a user equipment and another user equipment according to another embodiment of the present disclosure. In particular, an example of a flowchart of communication method between a gNB 800 and a UE 810 according to an embodiment of the present disclosure is shown. Alternatively, the example shown in FIG. 8 can also apply to the communication between UE 810 and another UE 820. The UE 810 can for example be the UE 100 as shown in FIG. 2 or the vehicle 101 as shown in FIG. 1, the gNB 800 can for example be the gNB 200 as shown in FIG. 1, and the UE 820 can be the vehicle 102 as shown in FIG. 1. Similar advantages associated with the above embodiment of UE 100 or vehicle 101 can also be achieved, with details omitted.

As shown in FIG. 8, the gNB 800/UE 820 transmits a plurality of downlink or sidelink beams to the UE 810. In response, the UE 810 receive a plurality of downlink beams from gNB 800 or a plurality of sidelink beams from another UE 820. Here, each downlink or sidelink beam can be associated with a set of downlink RS or a set of sidelink RS.

After the reception of the plurality of downlink or sidelink beams, the UE 810 determines the pathloss used for power control of a sidelink channel based on a set of reference signal(s) associated with the best downlink or sidelink beam determined by the UE 810 among the plurality of downlink or sidelink beams.

In an embodiment, if the pathloss used for the power control of a sidelink channel is determined based on the best downlink beam (e.g., in mode 1), then the best downlink beam is the best beam for receiving Synchronization Signal Block (SSB) measured by the user equipment in a specific time window; if the power used for the power control of a sidelink channel is determined based on the best sidelink beam (e.g., in mode 2), then the best sidelink beam is the best beam according to a beam management between the user equipment and another user equipment communicating with the user equipment.

In an embodiment, if there is not beam management for the case of the pathloss used for the power control of a sidelink channel being determined based on the best sidelink, then which reported reference signal received power received from another UE will be used for pathloss is based on the implementation of the UE.

Figure 9:
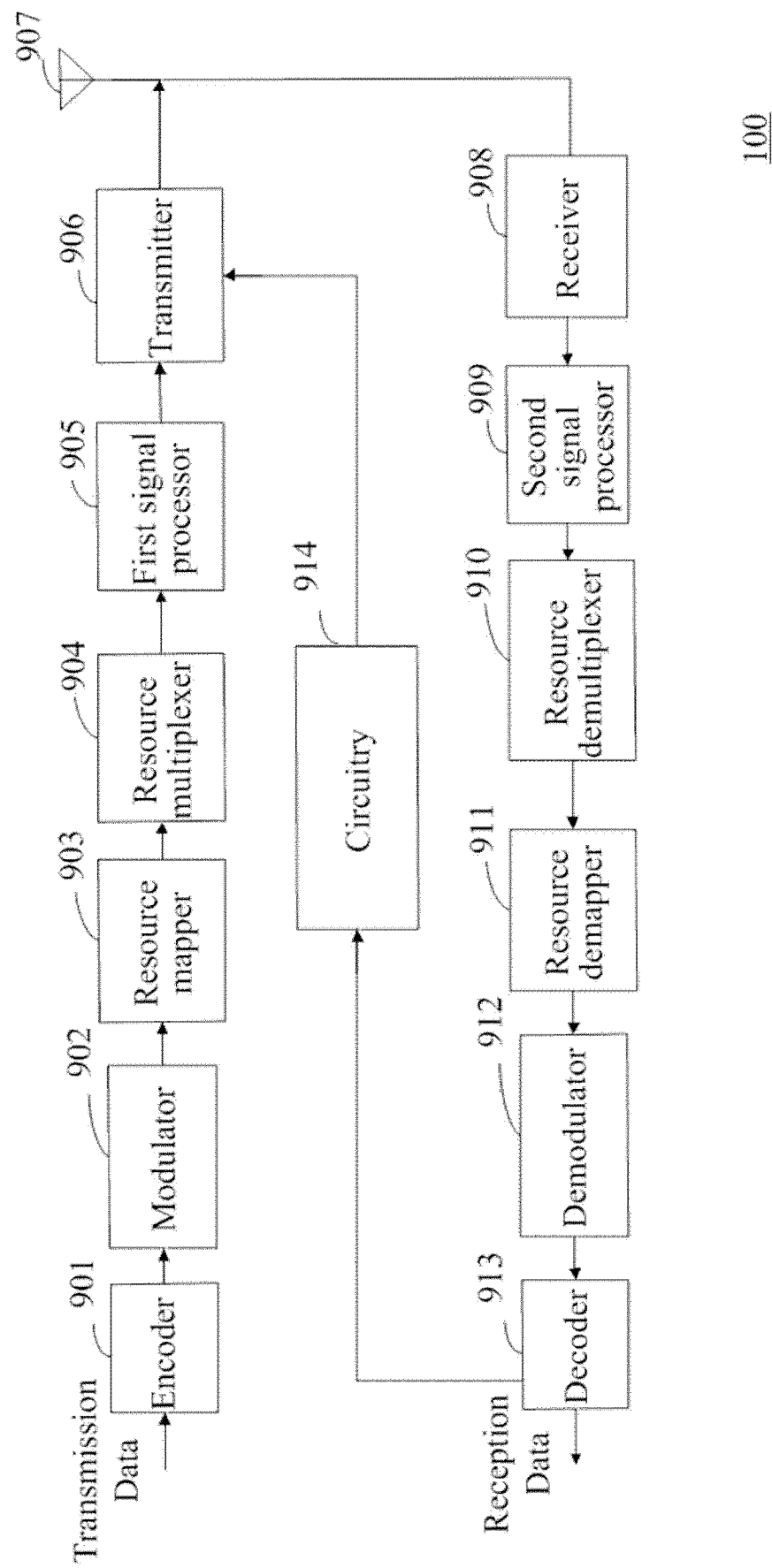
FIG. 9 systematically illustrates an example of a user equipment according to an embodiment of the present disclosure.

FIG. 9 systematically illustrates an example of a user equipment according to an embodiment of the present disclosure. As shown in FIG. 9, the UE 100 includes a encoder 901, a modulator 902, a resource mapper 903, a resource multiplexer 904, a first signal processor 905, a transmitter 906, an antenna 907, a receiver 908, a second signal processor 909, a resource demultiplexer 910, a resource demapper 911, a demodulator 912, a decoder 913 and a control circuitry 914.

For example, the encoder 901 performs encoding processing on transmission data, and the modulator 902 performs modulation processing on post-encoding transmission data to generate a data symbol. The resource mapper 903 maps the data symbol onto physical resources. For example, when the transmission data belongs to uplink data to be transmitted to gNB, the resource mapper 903 maps the data symbol onto Bandwidth Part (BWP) assigned for uplink transmission and reception. The resource multiplexer 904 multiplexes the data symbol and possible control information and/or synchronization information. The first signal processor 905 performs the signal processing on the multiplexed signal output from the resource multiplexer 904. The transmitter 906 transmits the processed uplink signal to for example gNB via the antenna 907.

In addition, the receiver 908 may receive a downlink transmission from gNB via the antenna 907. The downlink transmission can include indication information of power determination basis for sidelink transmission, the Indication information indicating a set of downlink reference signal(s) for determining pathloss used for power control of a sidelink channel to be transmitted by the user equipment or that the pathloss used for power control of the sidelink channel is determined based on sidelink reference signal(s). The second signal processor 909 performs the signal processing on the downlink signal received by the receiver 908. The resource demultiplexer 910 demultiplexes the processed downlink signal into downlink data and possible downlink control information and/or synchronization information. The resource demapper 911 demaps sidelink data symbol and possible downlink control information and/or synchronization information from physical resources. The demodulatoer 912 performs demodulation processing on the downlink data symbol and the decoder 913 performs decoding processing on the demodulated downlink data symbol to obtain the reception data. In addition, the demodulatoer 912 may also performs demodulation processing on possible downlink control information and/or synchronization information and the decoder 913 performs decoding processing on the demodulated downlink control information and/or synchronization information so as to output the indication information to the circuitry 914 for controlling sidelink transmission and reception. The circuitry 914 then can determine the pathloss used for power control of the sidelink channel based on the indication information, and further control the power of the transmitter 906 for the transmission of the sidelink channel.

In an embodiment, when the transmission data performed by the encoder 901 belongs to sidelink data to be transmitted to another UE, the resource mapper 903 maps the data symbol onto BWP assigned for sidelink transmission and reception. The resource multiplexer 904 multiplexes the data symbol and possible control information and/or synchronization information. The first signal processor 905 performs the signal processing on the multiplexed signal output from the resource multiplexer 904. The transmitter 906 transmits the processed sidelink signal to for example another UE via the antenna 907.

In an embodiment, the receiver 908 may receive sidelink transmissions from another UE via the antenna 907. The sidelink transmissions can include a plurality of sidelink beams. In this case, the circuitry 914 can determine the pathloss used for power control of a sidelink channel based on a set of reference signal(s) associated with the best sidelink beam determined by the UE 100 among the plurality of sidelink beams. In an embodiment, the best sidelink beam is the best beam according to a beam management between the user equipment and another UE communicating with the UE 100. Similarly, based on the determination, the circuitry 914 can control the power of the transmitter 906 for the transmission of the sidelink channel.

In a further embodiment, the receiver 908 may receive downlink transmissions from gNB via the antenna 907. The downlink transmissions can include a plurality of downlink beams. In this case, the circuitry 914 can determine the pathloss used for power control of a sidelink channel based on a set of reference signal(s) associated with the best downlink beam determined by the UE 100 among the plurality of downlink beams. In an embodiment, the best downlink beam is the best beam for receiving Synchronization Signal Block (SSB) measured by the user equipment in a specific time window.

Note that, the UE 100 shown in FIG. 9 may function as UE 100 as shown in FIG. 2 or vehicle 101 as shown in FIG. 1. Specifically, the receiver 908 may correspond to the receiver 120. The circuitry 120 may include the second signal processor 909, resource demultiplexer 910, resource demapper 911, demodulator 912, decoder 913 and the circuitry 914. Alternatively, one or more of these units may also be separated from the circuitry 120 depending on specific requirements. Similar advantages associated with the above embodiment of UE 100 or vehicle 101 can also be achieved, with details omitted.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Embodiments of the present disclosure can at least provide the following subject matters:

(1). A user equipment, comprising:
a receiver, operative to receive indication information of power determination basis for sidelink transmission, the indication information indicating a set of downlink reference signal(s) for determining pathloss used for power control of a sidelink channel to be transmitted by the user equipment or that the pathloss for power control of the sidelink channel is determined based on sidelink reference signal(s); and a circuitry, operative to determine the pathloss used for power control of the sidelink channel based on the indication information.

(2). The user equipment according to (1), wherein the power control of the user equipment is performed differently for different resource allocation modes.

(3). The user equipment according to (1) or (2), wherein the indication information is transmitted through at least one of Downlink Control Information (DCI), Radio Resource Control (RRC) information, Medium Access Control (MAC) information or any combination of them.

(4). The user equipment according to (3), wherein the indication information indicates the power determination basis for sidelink transmission by an index through Downlink Control Information (DCI), and an association of the power determination basis for sidelink transmission with the index is configured through Radio Resource Control (RRC) information, pre-configured or specified.

(5). The user equipment according to any one of (1)-(3), wherein the set of downlink reference signal(s) comprises at least one of Primary Synchronization Signal (PSS), Secondary Synchronization Signal (SSS) and Channel State Information-Reference Signals (CSI-RS).

(6). The user equipment according to (5), wherein Primary Synchronization Signal (PSS), Secondary Synchronization Signal (SSS) and/or Channel State Information-Reference Signals (CSI-RS) in the set of downlink reference signal(s) are from one or more downlink beams.

(7). The user equipment according to any one of (1)-(6), wherein the indication information indicates the power determination basis for sidelink transmission separately for Physical Sidelink Control Channel (PSCCH) and Physical Sidelink Shared Channel (PSSCH).

(8). The user equipment according to any one of (1)-(7), wherein the indication information indicates the power determination basis for sidelink transmission for Physical Sidelink Feedback Channel (PSFCH) separately from power determination basis for sidelink transmission for Physical Sidelink Control Channel (PSCCH) and Physical Sidelink Shared Channel (PSSCH).

(9). The user equipment according to any one of (1)-(8), wherein the indication formation indicates the same power determination basis for any two or three of Physical Sidelink Control Channel (PSCCH), Physical Sidelink Shared Channel (PSSCH) and Physical Sidelink Feedback Channel (PSFCH).

(10). The user equipment according to (7), wherein pathloss used for power control of PSCCH and pathloss used for power control of PSSCH are in a fixed relationship.

(11). The user equipment according to (1), wherein parameters of P(0) and alpha used for power control of a sidelink channel are configured, preconfigured, or associated with the pathloss used for power control of the sidelink channel.

(12). A user equipment, comprising:
a receiver, operative to receive indication information of power determination basis for sidelink transmission, the indication information indicating a set of sidelink reference signal(s) for determining pathloss used for power control of a sidelink channel to be transmitted by the user equipment; and a circuitry, operative to determine the pathloss used for power control of the sidelink channel based on the indication information.

(13). The user equipment according to (12), wherein the indication information is transmitted through Sidelink Control Information (SCI).

(14). The user equipment according to (12) or (13), wherein the sidelink channel is Physical Sidelink Feedback Channel (PSFCH).

(15). A user equipment, comprising:
a receiver, operative to receive a plurality of downlink or sidelink beams; and
a circuitry, operative to determine the pathloss used for power control of a sidelink channel based on a set of reference signal(s) associated with the best downlink or sidelink beam determined by the user equipment among the plurality of downlink or sidelink beams.

(16). The user equipment according to (13), wherein the best downlink beam is the best beam for receiving Synchronization Signal Block (SSB) measured by the user equipment in a specific time window; or
the best sidelink beam is the best beam according to a beam management between the user equipment and another user equipment communicating with the user equipment.

(17). A wireless communication method for a user equipment, comprising:
receiving indication information of power determination basis for sidelink transmission, the indication information indicating a set of downlink reference signal(s) for determining pathloss used for power control of a sidelink channel to be transmitted by the user equipment or that the pathloss for power control of the sidelink channel is determined based on sidelink reference signal(s); and
determining the pathloss used for power control of the sidelink channel based on the indication information.

(18). The wireless communication method according to (17), wherein
the power control of the user equipment is performed differently for different resource allocation modes.

(19). The wireless communication method according to (17) or (18), wherein
the indication information is transmitted through at least one of Downlink Control Information (DCI), Radio Resource Control (RRC) information, Medium Access Control (MAC) information or any combination of them.

(20). The user equipment according to (19), wherein
the indication information indicates the power determination basis for sidelink transmission by an index through Downlink Control Information (DCI), and
an association of the power determination basis for sidelink transmission with the index is configured through Radio Resource Control (RRC) information, pre-configured or specified.

(21). The user equipment according to any one of (17)-(19), wherein
the set of downlink reference signal(s) comprises at least one of Primary Synchronization Signal (PSS), Secondary Synchronization Signal (SSS) and Channel State Information-Reference Signals (CSI-RS).

(22). The user equipment according to (21), wherein
Primary Synchronization Signal (PSS), Secondary Synchronization Signal (SSS) and/or Channel State Information-Reference Signals (CSI-RS) in the set of downlink reference signal(s) are from one or more downlink beams.

(23). The user equipment according to any one of (17)-(22), wherein the indication information indicates the power determination basis for sidelink transmission separately for Physical Sidelink Control Channel (PSCCH) and Physical Sidelink Shared Channel (PSSCH).

(24). The user equipment according to any one of (17)-(23), wherein the indication information indicates the power determination basis for sidelink transmission for Physical Sidelink Feedback Channel (PSFCH) separately from power determination basis for sidelink transmission for Physical Sidelink Control Channel (PSCCH) and Physical Sidelink Shared Channel (PSSCH).

(25). The user equipment according to any one of (17)-(24), wherein the indication formation indicates the same power determination basis for any two or three of Physical Sidelink Control Channel (PSCCH), Physical Sidelink Shared Channel (PSSCH) and Physical Sidelink Feedback Channel (PSFCH).

(26). The user equipment according to (25), wherein pathloss used for power control of PSCCH and pathloss used for power control of PSSCH are in a fixed relationship.

(27). The user equipment according to (17), wherein parameters of P(0) and alpha used for power control of a sidelink channel are configured, preconfigured, or associated with the pathloss used for power control of the sidelink channel.

(28). A wireless communication method for a user equipment, comprising:
receiving indication information of power determination basis for sidelink transmission, the indication information indicating a set of sidelink reference signal(s) for determining pathloss used for power control of a sidelink channel to be transmitted by the user equipment; and
determining the pathloss used for power control of the sidelink channel based on the indication information.

(29). The wireless communication according to (28), wherein
the indication information is transmitted through Sidelink Control Information (SCI).

(30). The wireless communication method according to (28) or (29), wherein
the sidelink channel is Physical Sidelink Feedback Channel (PSFCH).

(31). A wireless communication method for a user equipment, comprising:
receiving a plurality of downlink or sidelink beams; and
determining the pathloss used for power control of a sidelink channel based on a set of reference signal(s) associated with the best downlink or sidelink beam determined by the user equipment among the plurality of downlink or sidelink beams.

(32). The wireless communication method according to (31), wherein
the best downlink beam is the best beam for receiving Synchronization Signal Block (SSB) measured by the user equipment in a specific time window; or
the best sidelink beam is the best beam according to a beam management between the user equipment and another user equipment communicating with the user equipment.

The invention claimed is:

1. A user equipment, comprising:
   a receiver, which, in operation, receives indication information of power control for a transmission of a sidelink channel, the indication information indicating that (i) in a first case, a sidelink reference signal is used for a determination of pathloss used for the power control of the sidelink channel, and (ii) in a second case, a downlink reference signal is used for the determination of the pathloss; and
   circuitry, which, in operation, determines the pathloss based on the sidelink reference signal in the first case, and determines the pathloss based on a single downlink reference signal determined from a plurality of downlink reference signals in the second case, the plurality of downlink reference signals associated with a plurality of beams,
   wherein a parameter P0 and a parameter alpha, which are used for the power control of the sidelink channel, are common between the plurality of beams.

2. The user equipment according to claim 1, wherein the indication information is transmitted through Downlink Control Information (DCI), Radio Resource Control (RRC) information, Medium Access Control (MAC) information or any combination of them.

3. The user equipment according to claim 1, wherein the plurality of downlink reference signals comprise a Primary Synchronization Signal (PSS) and/or a Secondary Synchronization Signal (SSS).

4. The user equipment according to claim 3, wherein the Primary Synchronization Signal (PSS) and/or the Secondary Synchronization Signal (SSS) in the plurality of downlink reference signals are from one or more downlink beams.

5. The user equipment according to claim 1, wherein the indication information indicates the power control for a Physical Sidelink Feedback Channel (PSFCH) separately from the power control for a Physical Sidelink Shared Channel (PSSCH).

6. The user equipment according to claim 1, wherein a power of a Physical Sidelink Control Channel (PSCCH) is determined based on a power of a Physical Sidelink Shared Channel (PSSCH).

7. The user equipment according to claim 1, wherein the parameters P0 and alpha are different between the first case and the second case.

8. A communication method, comprising:
   receiving indication information of power control for a transmission of a sidelink channel, the indication information indicating that (i) in a first case, a sidelink reference signal is used for a determination of pathloss used for the power control of the sidelink channel, and (ii) in a second case, a downlink reference signal is used for the determination of the pathloss; and
   determining the pathloss based on the sidelink reference signal in the first case, and determining the pathloss based on a single downlink reference signal determined from a plurality of downlink reference signals in the second case, the plurality of downlink reference signals associated with a plurality of beams,
   wherein a parameter P0 and a parameter alpha, which are used for the power control of the sidelink channel, are common between the plurality of beams.

9. The communication method according to claim 8, wherein
   the indication information is transmitted through Downlink Control Information (DCI), Radio Resource Control (RRC) information, Medium Access Control (MAC) information or any combination of them.

10. The communication method according to claim 8, wherein
    the plurality of downlink reference signals comprise a Primary Synchronization Signal (PSS) and/or a Secondary Synchronization Signal (SSS).

11. The communication method according to claim 10, wherein
    the Primary Synchronization Signal (PSS) and/or the Secondary Synchronization Signal (SSS) in the plurality of downlink reference signals are from one or more downlink beams.

12. The communication method according to claim 8, wherein
    the indication information indicates the power control for a Physical Sidelink Feedback Channel (PSFCH) separately from the power control for a Physical Sidelink Shared Channel (PSSCH).

13. The communication method according to claim 8, wherein
    a power of a Physical Sidelink Control Channel (PSCCH) is determined based on a power of a Physical Sidelink Shared Channel (PSSCH).

14. The communication method according to claim 8, wherein
    the parameters of P0 and alpha are different between the first case and the second case.

* * * * *